Dec. 17, 1940.   M. SCHWARTZ ET AL   2,225,596
PHOTOGRAPHIC APPARATUS
Filed July 18, 1938   7 Sheets-Sheet 1
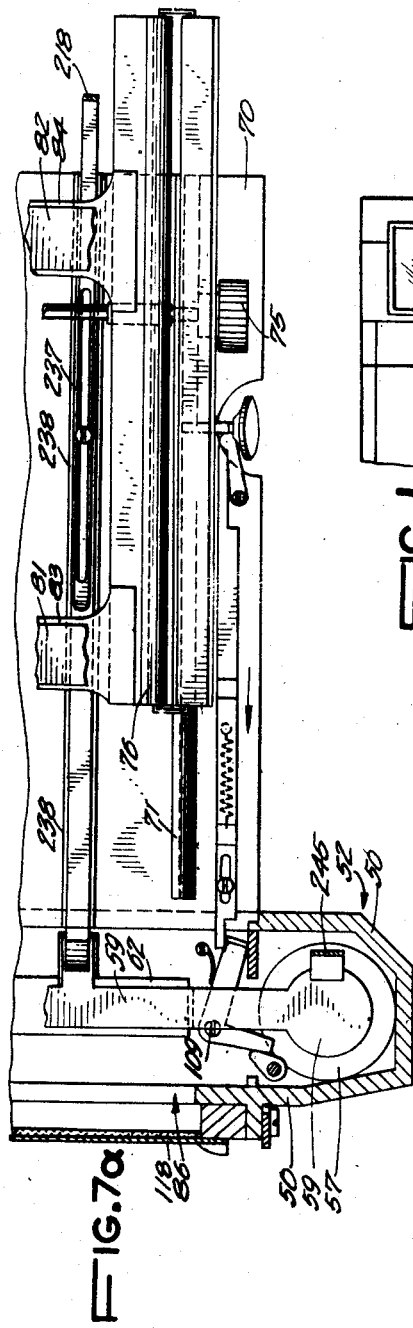
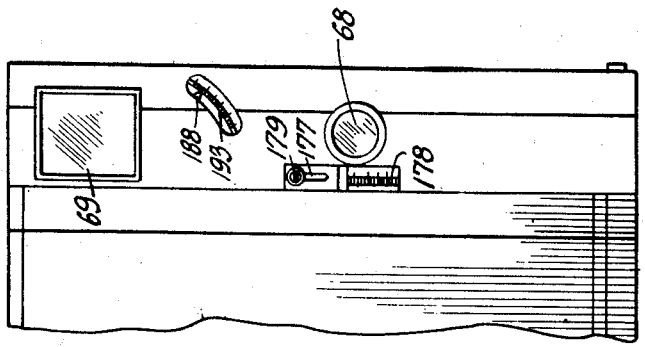
INVENTORS
MORRIS SCHWARTZ
WILLIAM CASTEDELLO
BY Louis Casper
ATTORNEY.

Dec. 17, 1940. M. SCHWARTZ ET AL 2,225,596
PHOTOGRAPHIC APPARATUS
Filed July 18, 1938 7 Sheets-Sheet 2
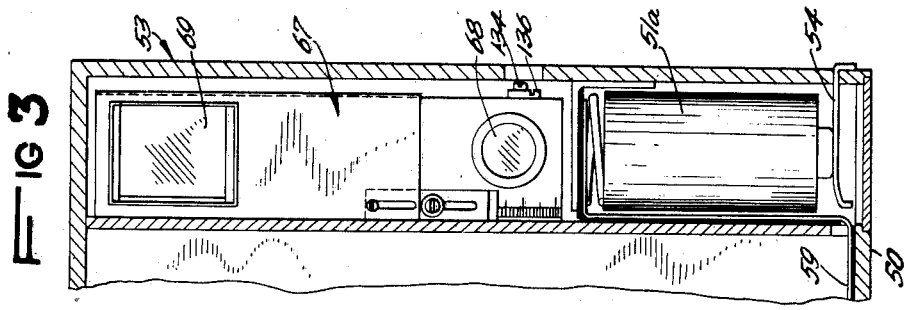
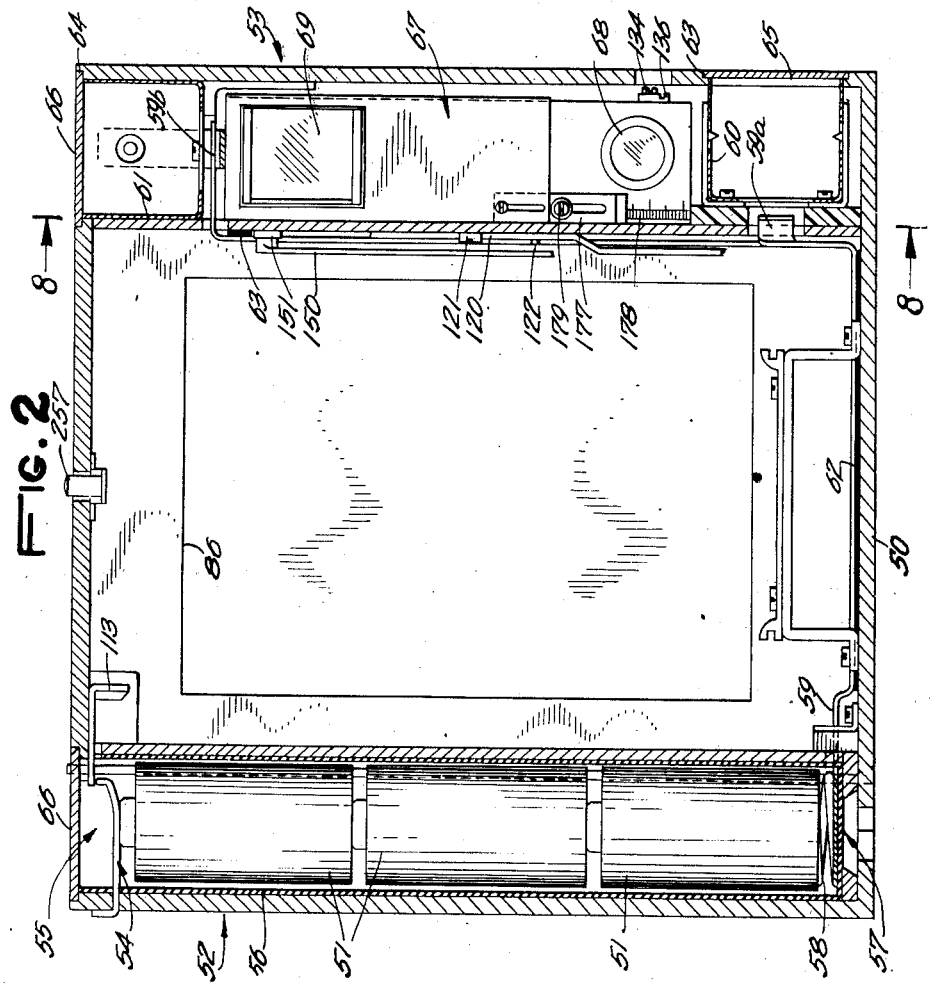
INVENTORS
MORRIS SCHWARTZ
WILLIAM CASTEDELLO.
BY
Louis Casper
ATTORNEY.

Dec. 17, 1940.                M. SCHWARTZ ET AL                2,225,596
                              PHOTOGRAPHIC APPARATUS
                              Filed July 18, 1938            7 Sheets-Sheet 3
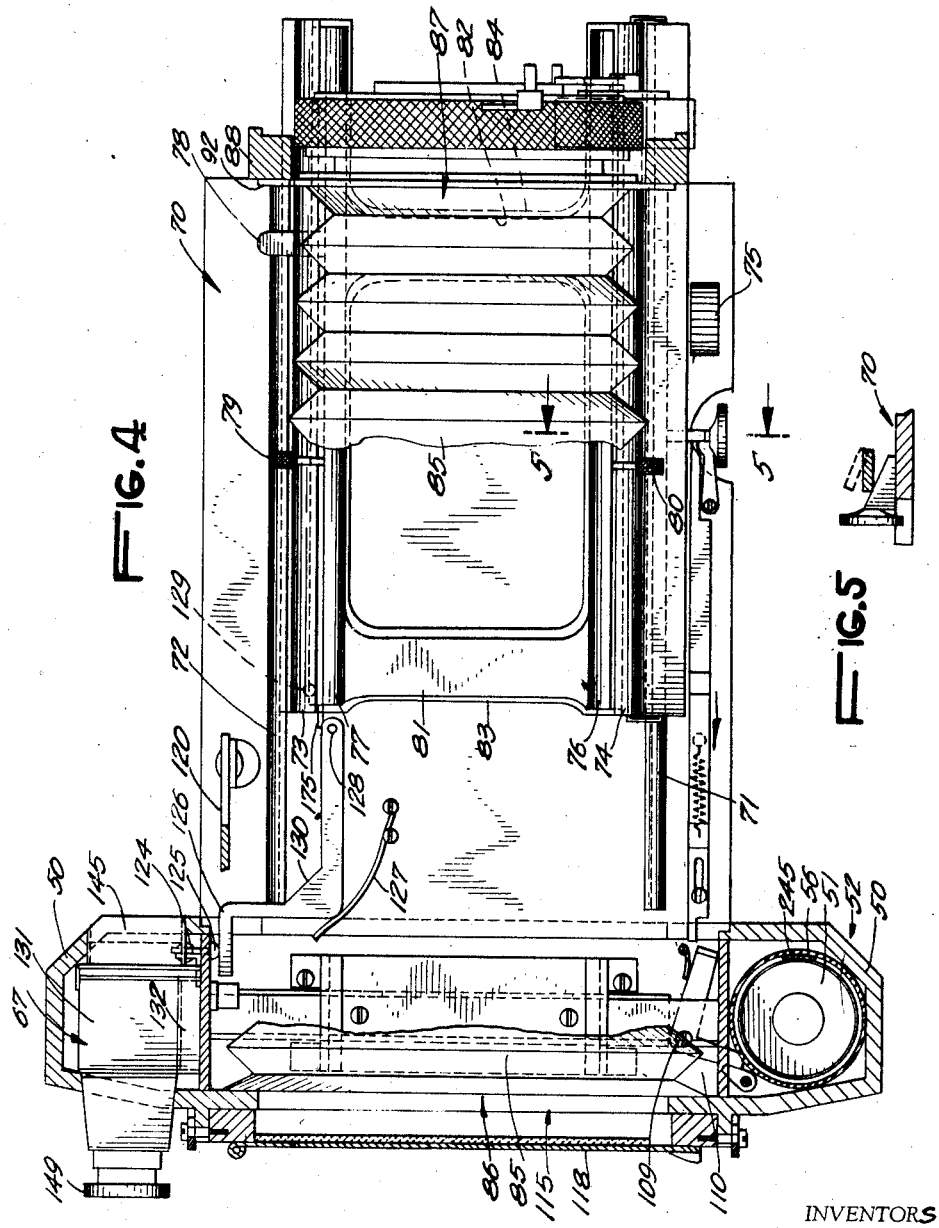
INVENTORS
MORRIS SCHWARTZ
WILLIAM CASTEDELLO.
BY Louis Casper
ATTORNEY.

Dec. 17, 1940.    M. SCHWARTZ ET AL    2,225,596
PHOTOGRAPHIC APPARATUS
Filed July 18, 1938    7 Sheets-Sheet 4
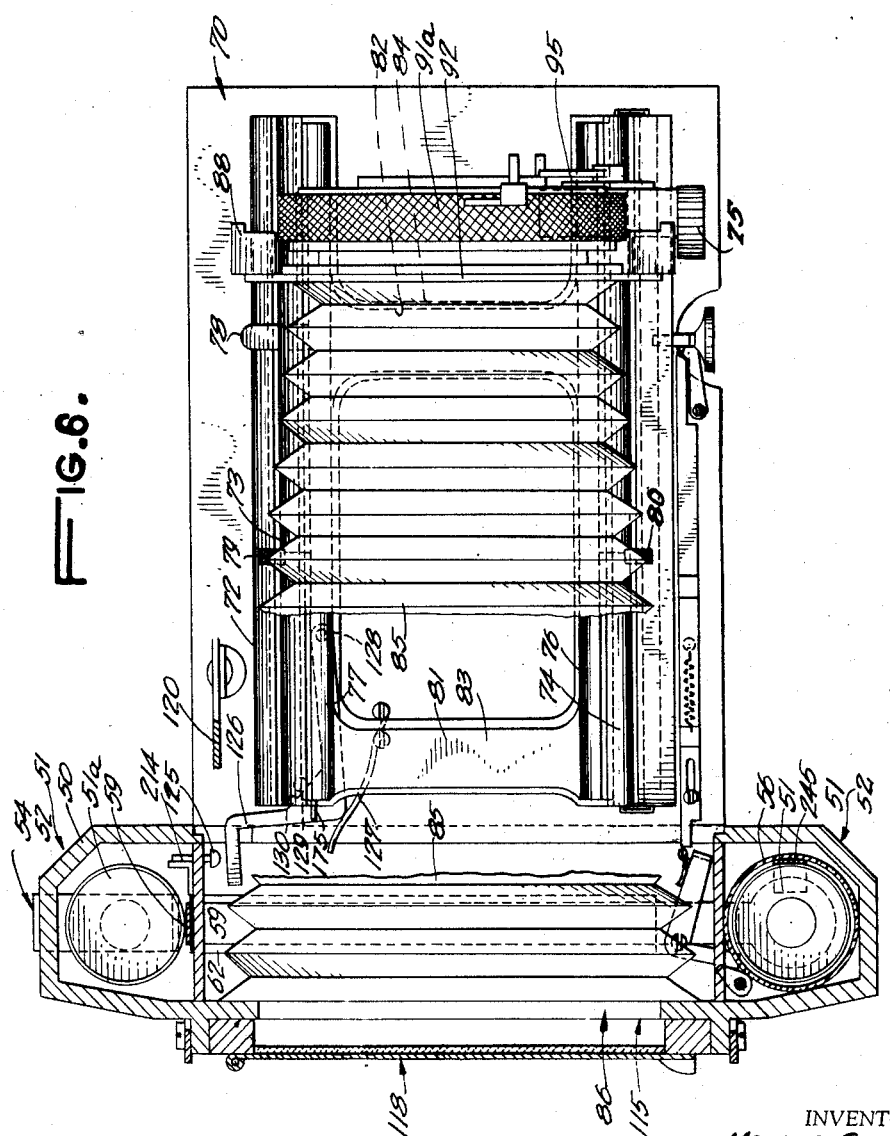
INVENTORS
MORRIS SCHWARTZ
WILLIAM CASTEDELLO.
BY
Louis Casper
ATTORNEY.

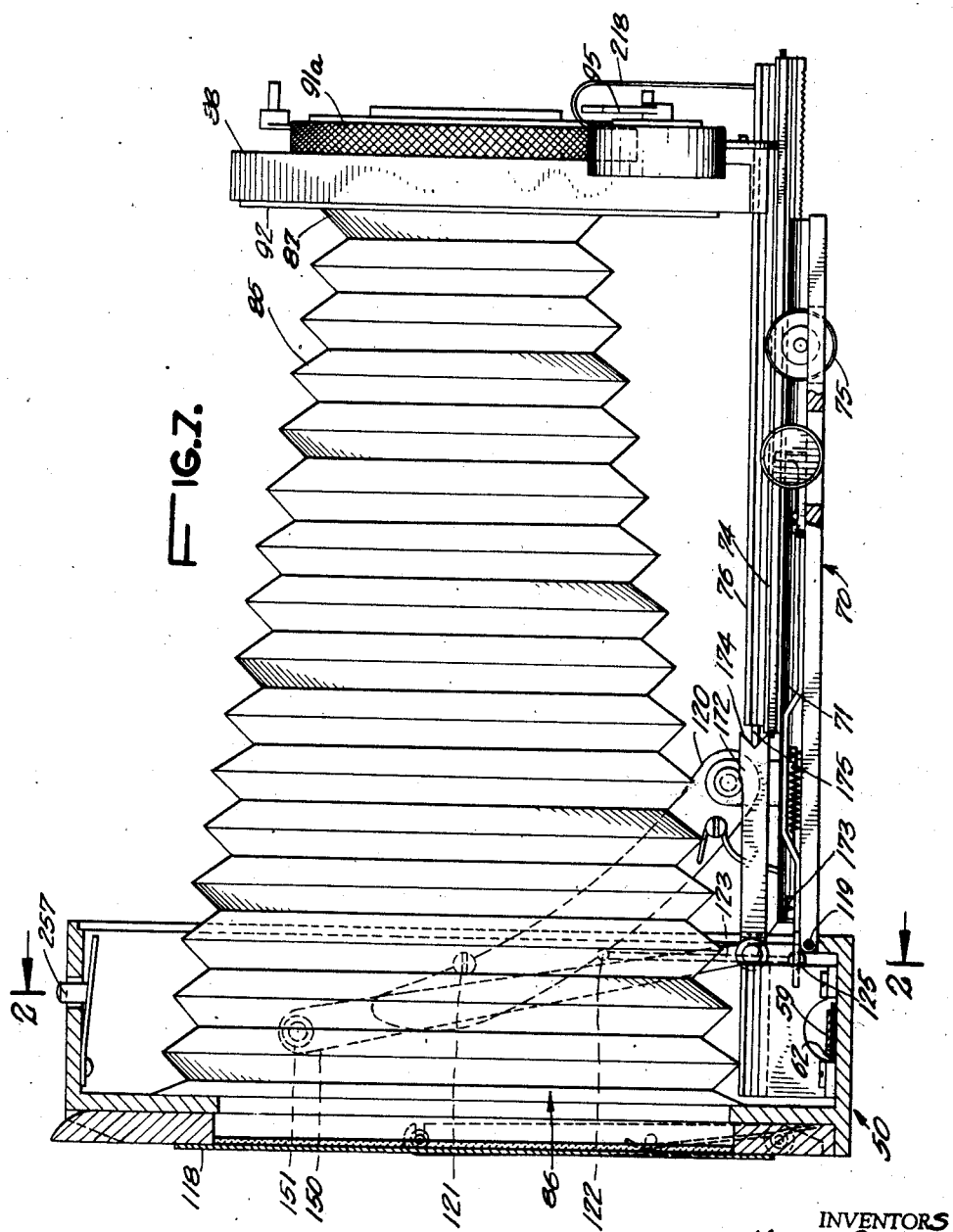

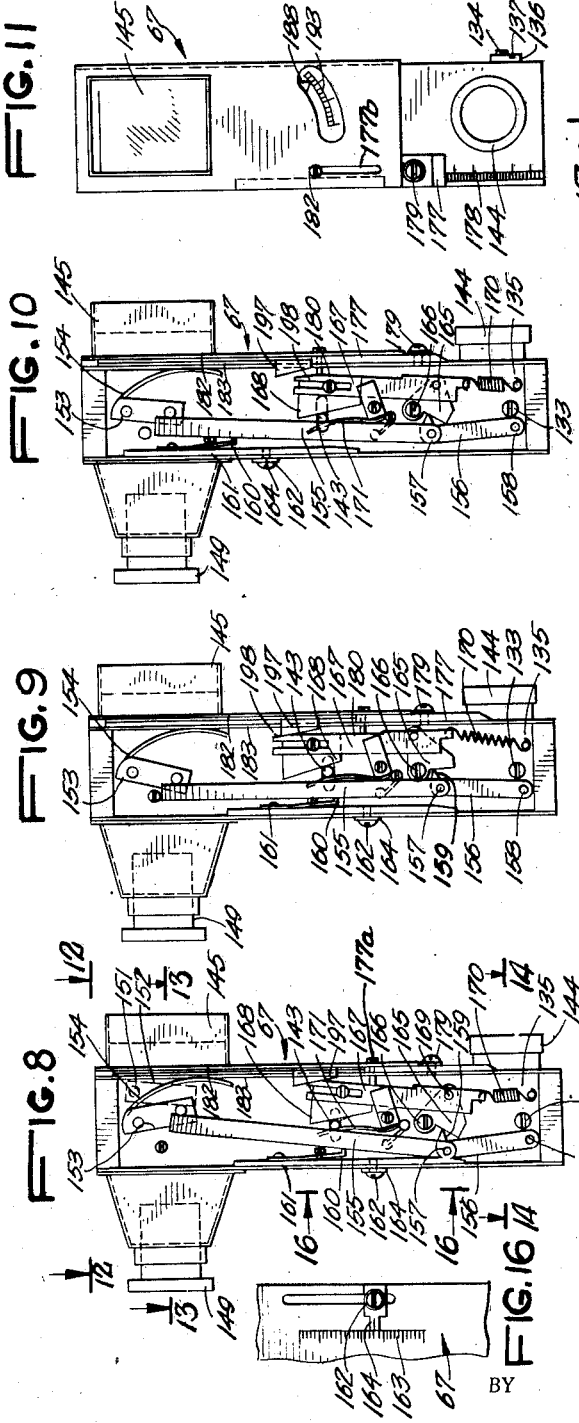

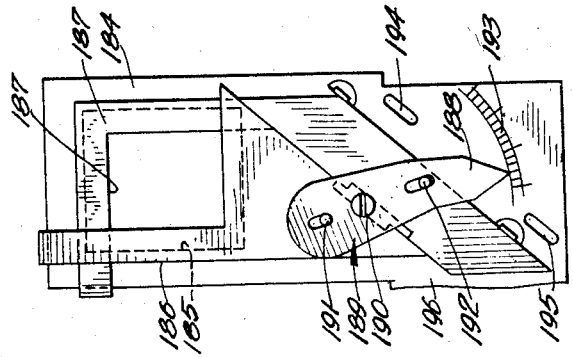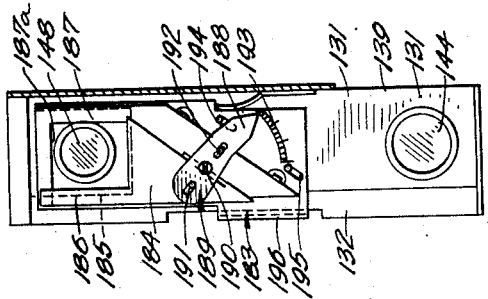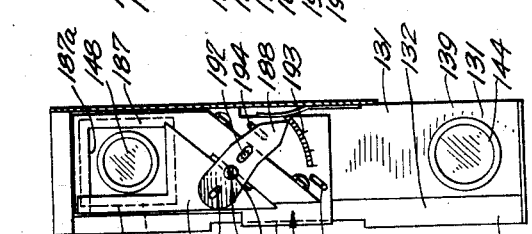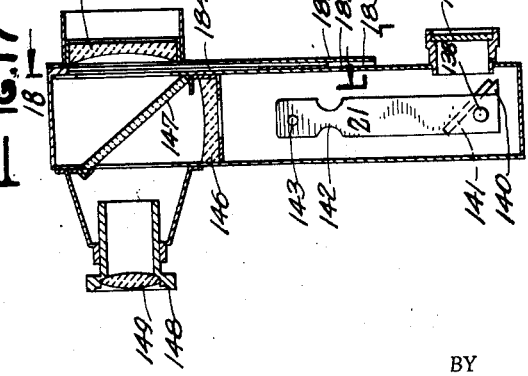

Patented Dec. 17, 1940

2,225,596

UNITED STATES PATENT OFFICE 2,225,596

PHOTOGRAPHIC APPARATUS

Morris Schwartz, Sunnyside, Long Island, and William Castedello, Huntington, N. Y., assignors, by direct and mesne assignments, to The Kalart Company, Inc., New York, N. Y., a corporation of New York Application July 18, 1938, Serial No. 220,444

9 Claims. (Cl. 95—44)

Our invention relates to photographic picture taking apparatus, especially of the kind that comprise a combination of a range finder, and a photo-flash synchronizer integral to said apparatus and the aforesaid elements are so incorporated in the camera apparatus as to form a complete operative unit.

An object of this invention is to provide a complete, easily portable and compact camera apparatus including therein a range finder for automatically locating and focusing objects to be photographed by the camera apparatus aforesaid.

A further object of the invention is to provide adjusting means in said camera apparatus to adjustably adapt said range finder and view finder for different focal lengths of lenses.

Other objects will be seen as the description of our invention proceeds.

Our invention has a continuing relation to U. S. Patent No. 2,163,159, issued June 20, 1939 to Morris Schwartz.

Referring to the figures—

Fig. 1 is a view of a camera body with the range finder placed on the upper part of said camera body.

Fig. 2 is a section through the camera taken on the line 2—2 of Fig. 7 showing the battery arrangement, and the position of the range finder in the camera when the flash light is plugged into the camera body.

Fig. 3 shows the range finder positioned in the upper part of the camera with an extra cell of battery added.

Fig. 4 is a partial cross-section plan view of the camera shown in open position when the bellows of the camera is expanded.

Fig. 5 is a detail view taken on a line 5—5 of Fig. 4.

Fig. 6 is a sectional view showing the camera in open position just prior to being closed.

Fig. 7 is a side cross-section view showing the camera in open position with the bellows expanded.

Fig. 7ª is a partial cross-sectional view of the camera.

Fig. 8 shows the range finder mechanism which is included in Fig. 2 when viewed in the direction of the section 8—8 of said figure.

The finder illustrated in Fig. 8 is shown in non-operative position.

Fig. 9 shows the relation of the parts of the finder mechanism shown in Fig. 8 in operative position.

Fig. 10 shows the relation of parts of the finder illustrated in Fig. 8 with respect to adjustment fo different types lenses.

Fig. 11 is a side view of the range finder taken on the line 11—11 of Fig. 10.

Fig. 12 is a top view of the range finder taken on the line 12—12 of Fig. 8.

Fig. 13 is a section through the range finder arrangement shown in Fig. 8 taken on the line 13—13 of said figure.

Fig. 14 is a section taken on the line 14—14 of Fig. 8.

Fig. 15 is a modified view of an eye piece and upper objective of a range finder.

Fig. 16 is a view showing the scaled adjustments of said finder. This view is taken on the line 16—16 of Fig. 8.

Fig. 17 is a cross-section view of the finder shown in Fig. 11 taken on the line 17—17 showing the position of the lenses; also showing the reflecting mirrors.

Fig. 18 is a section taken on the line 18—18 o Fig. 17 showing the arrangement for decreasing the size of the aperture of the viewing lens o the range finder. This arrangement is shown in non-operative position.

Fig. 19 shows the position of parts of the viewing mask in position for correction of the view finder parallax.

Fig. 20 shows the relation of parts of the range finder mask shown in Fig. 18 when said finder is adjusted for decreasing the angle of vision to coincide with the angle of the camera lens which involves the size of aperture of the viewing lens Fig. 21, shows the reflecting mirror taken on the line 21—21 of Fig. 17.

Referring to Fig. 2, the camera body 50 comprises a compartment for holding a set of battery cells on one side of the camera body 52 and a range finder on the opposite side of said body designated at 53. The battery cells 51 are connected in series and said battery is grounded to the camera body by means of a spring contact 54, the latter being so arranged that said spring contact can be slid out of normal position to allow refilling of the camera with battery cell renewals.

In addition to the aforesaid grounding connection for the battery, the spring contact 54 prevents the battery from dropping out of the camera. A cover 55 covers the battery cell refill aperture 56. The battery cells 51 are insulated from the camera proper by means of insulation tubing 56 and also by the insulation washer 57

The bottom section of the battery cells 51 is connected through a spring 58 to the electrical connection 59. The connection 56 extends across to the opposite side of the camera 53 and terminates at 59ᵃ and 59ᵇ in the sockets 60 and 61.

Pins 79 and 80 serve to limit the movement of the rails 76, 77. The rails 76, 77 are held together by cross-members 81 and 82. The rails 73 and 74 are held together by means of cross-members 83 and 84. The rails 71 and 72 are secured to the camera bed 70. (See Fig. 6.)

One end of the bellows 85 is secured at designation 86 to the body of the camera, (Fig. 7) the opposite end at 87 being secured to the lens support 88. The lens support 88 has sliding shoes 89 and 90, which slide into the rails 85 and 86 when the winged thumb release 91 is operated by the camera operator. The pins 79 and 80 serve in this case to limit the movement of the lens support 88.

The lens and the shutter 91ᵃ are held to the lens support 88 by a plate 92. The flash light release arrangement 93 is secured directly to the lens support 88. A slidably mounted bar 94 operates the flash light release arrangement in timed relation to the camera shutter.

An impinging arm 95 operates the shutter 91 when said impinging arm 95 depresses the shutter arm 96.

The electrical connection 59 is insulated from the body of the camera at 62. The apertures 63 and 64 of the sockets 60 and 61 are covered through the medium of covers 65, 66.

The range finder 67 is located in the space between the sockets 60 and 61.

The range finder 67 has two viewing objective lenses 68 and 69 which extend on the outside of the camera 50.

The arrangement shown in Fig. 3 includes four cells of battery instead of 3 cells and the electrical connection 59 connects the additional cell of battery 51ᵃ to the battery 51.

Referring to Fig. 4. In this figure the camera 50 is shown in open position. The bed 70 of said camera carries parallel rails 71, 72. Another pair of rails 73, 74 slide into rails 71 and 72, said sliding being attained by the turning of the knob 75.

A further addition of a pair of rails 76 and 77 is provided and are so arranged that said rails can slide on rails 73 and 74 by pressing upon a spring 78, said spring 78 leaving the rails 76 and 77 free to slide in the rails 73 and 74.

Preparatory to housing the lens support, the pin 129 which is secured at the bottom of the rail 73, rides over a tapered side section 130 of the forked hinging arm 126, thus depressing said arm against the spring 127 and allowing the pin 122 (Fig. 7) to be housed into the body of the camera and thus allowing the strut 120 to be released and which will enable the proper housing of the bellows and lens support 88.

The range finder 67 includes a rectangular casing 131. Another rectangular casing 132 is held to said casing 131. The rectangular casing 131 has a pair of trunnion screws 133 and 134. The trunnion screw 133 is threaded through the side 135 of the rectangular casing 132. (See Fig. 21.) The trunnion screw 134 is threaded in an eccentric bushing 136 which can be turned by inserting a screw driver in the slot 137. The eccentric bushing 136 rotates in an opening 138ᵃ of the side 139 of the rectangular casing 131. A trunnion pin 138 is located between said trunnion screws 133 and 134.

A three angled block 140 is secured to the trunnion screw 138. The block 140 has a mirror 141 and an arm 142 which is also secured to the block 140. The arm 142 has a pin 143 which extends through the side 135 of the rectangular casing 132.

A viewing glass 144 is located at the lower part of the casing 131. A lens 145 is located at the upper part of the casing 141. Another lens 146 divides the lower part of the casing 131 from the upper part thereof.

A transparent mirror 147 is angularly positioned above the lens 146. An eye piece 148 having a lens 149 faces the transparent mirror 147.

Referring to Figs. 7, a hinging arm 150 swings at the pivot bearing 151 in such a manner that an arm member 152 is operated and said arm member 152 actuates another hinging arm 153 (Fig. 8), the latter being under tension of a spring 154 to operate a hinged bar 155. The rocking bar 155 also swings on a hinged arm 156 and a pivoted arm 157. The arm 156 swings at pivot bearing 158. The hinged bar 155 is operably balanced on a pivot point 160. The position of the pivot point 160 can be adjustably moved by sliding a bar 161 that is held in place through the medium of a screw 162.

A scale 162 (Fig. 16) and a scale pointer 164 serve as a means for adjusting the pivot point 160 (Fig. 8) into the desired position.

A tooth member 159 integral to the arm 156 is in operable contact with a hinged segment 165 that swings at pivot bearing 166. A bar 167 is moved upwardly by means of the hinging movement of the hinged segment 165. Said bar 167 carries a tapered surface plate 168. (See Fig. 8.) The bar 167 is held to the segment 165 at 169 and has a spring 170 which holds said bar 167 under tension. A flat spring 171 presses against the pin 143.

In Fig. 9 is shown the relation of parts of the range finder mechanism in operation. When the tooth member 159 of the hinged arm 156 is pushed against the hinged segment 165, the bar 167 moves upwards. The tapered surface plate 168 moves also in the same direction as the bar 167. As the width of the plate 168 decreases at the bottom thereof, there is an allowable play so that the pin 143 moves to the right. As the pin 143 is secured to the hinging arm 142 (see Fig. 17), the mirror 141 is hinged on said arm, therefore, when viewing through the viewing tube 148 the image of an object is projected through the lens 145 and is reflected upon the transparent mirror 147.

A composite image of the object also projects through the viewing glass 144 and reflects upon the mirror 141 and projecting through the lens 146 on to the transparent mirror 147.

The hinging arm 150 has another arm 172 that pivots at 173 (Fig. 7). Said arm 172 has a tapered cut-out 174. A tapered pin 175 fits into said tapered cut-out 174. The tapered pin 175 is secured to the rail 77 (Fig. 4). When the camera operator turns the focusing knob 75 for focusing the camera, the rail 77 which is moved during the aforementioned operation and which carries the tapered pin 175, pushes against the arm 172 which in turn operates the hinging arm 150. The hinging arm 150 operating the arm 152 pivotally moves the arm 155. The tooth member 159 (Fig. 8) operates the hinged segment 165, and the tapered plate 168 will then operate the pin 143 which being secured to the arm 142 tilts the mirror 141.

The reflection of the object from the mirror 141 entering through the lens 146 will coincide with the image of the object projecting through the lens 145 and reflecting on the transparent mirror 147. When this occurs the correct focus has been attained.

A slidably mounted bar 177 is made adjustable on the scale 178 (Fig. 11) by the turning of the screw 179. The sliding bar 177 carries a swivel point 180 so that the bar 167 can swivel on said point. An infinity adjusting screw 177ª is mounted on the bar 177. The function of said screw is to obtain the correct infinity point when said camera is assembled. In the application of different type of lenses, it is necessary to adjust the bar 177 to conform to the type of lens that is mounted on said camera. After the bar 177 has been moved either up or down to the required position to obtain the aforesaid lens adjustment, the screw 179 in slot 177ᵇ (Fig. 11) is screwed tight and holds the bar 177 in the desired position. The adjusting screw 177ª is threaded into the bar 177 and the pointed end of said screw bears against the arm 167. The position of said screw against the arm 167 causes said arm to swivel at a certain angle thereby compensating for any differences in distance between the range finder and the camera lens with respect to the object being photographed. This feature is especially desirable in close-up work and when so performed a slight difference in distance between the range finder, the camera lens and the object to be photographed might militate against taking a good sharp picture.

A flat covered member 182 is mounted on the outside of the rectangular casing 131 at 181 (Fig. 17), in such a manner that the space area between 181 and the member 182 can be used for inserting an aperture adjusting mechanism. (See Fig. 18.) The aperture adjusting mechanism 183 comprises a flat plate 184 having a rectangular opening 185. A leg shaped flat plate 186 and a leg shaped flat plate 187 are moved on the surface of the plate 184 in such a manner that the rectangular opening 187 formed by the legs of the leg shaped plates 186 and 187 can be increased or decreased when moving the top 188 of the hinging lever 189. The hinging lever 189 pivots at 190 and is held to the leg shaped flat plate 186 at 191, and the leg shaped plate 187 at 192. Scale markings 193 serve as a guide for manual adjustment of the hinging arm 189.

The flat plate 184 also has slots 194 and 195, said slots being provided to permit a parallax adjustment of said plate.

An extension section 196 of the flat plate 184 has a tapered surface 197 (see Fig. 9) which is in touch with the extension 198 of the arm 167 so that when the bar 167 advances upwardly, said flat plate 184 is moved towards the center of the lens 145. When the hinging bar 167 returns to its original position, the flat plate 184 moves away from the center of the lens.

*Operation*

After the plate holder slide is removed, the operator views the object through the viewing tube 148 and at the same time turns the knob 75 to obtain the correct focus, said adjustment depending upon the distance of the object. The knob 75 is turned until two images of the object being viewed are merged in the range finder. The merging of the two aforesaid images is obtained through the viewing glass 144 which then reflects upon the mirror 141 and which in turn is projected upon the mirror 147 through the lens 146. Said image then merges with the image observed through the eye piece of the same object entering through the lens 145 and projecting through the transparent mirror 147. When both images merge, as already stated, a correct focus is obtained.

It is understood that the particular photographic apparatus described above is intended to be merely illustrative and not limitative of the invention, since it is obvious that the invention may be effected by apparatus arranged in other different ways, within the scope of the claims.

Now having described our invention, what we claim is:

1. In a photographic apparatus including a casing, said casing having a range finder unit attached thereto, said apparatus having a bellows, one end of said bellows secured to an objective carrier, said carrier having a lens and shutter means operating in conjunction with said lens, said carrier secured to a slidably mounted carriage, said carriage manually operable through the medium of a rotating hand screw, said hand screw mounted on said carriage, said range finder including a mirror reflector affixed upon a tilting block, the reflection of objects through an eyelet aperture upon said tilting reflector being projected upon an angularly positioned and fixed transparent mirror, said mirror transparent to direct viewing in addition to said reflection of objects through an adjacent eyelet aperture thereby producing a duplicate image of said objects upon said fixed reflector, said tilting block coacting with said sliding carriage by linkage means said linkage means including hinging arm means the rearward movement thereof being under spring tension, said hinging arm means being pivoted in said range finder unit, and having a tapered cut out portion, a pin member operably fitted in said tapered cut out portion, said pin member integral to said carriage, said linkage means thereby following the reciprocal movement of the carriage aforesaid.

2. In a photographic apparatus, said apparatus having a casing, a range finder attachable to said casing, said range finder having two mirrors one fixed and the other movable, said movable mirror attached to and movable with a swinging bar, a contact pin attached to said swinging bar, a reciprocally movable arm in operable contact with said contact pin, said arm having a contacting surface, said surface on an inclined plane within the area of the limit movement of contact of said contact pin, said arm in operable engagement with an angular auxiliary member, said auxiliary member made operable by a rocking bar, said rocking bar in operable engagement with linkage means exterior to said range finder proper, said linkage means contiguous to and moved in accordance with the movement of the objective carrier of said photographic apparatus, whereby the tilting movement of said mirror is made through the medium of the adjustable movement of said objective carrier, said linkage means including a hinging arm, the rearward movement thereof being impelled by spring tension, an extending member pivotally attached to said hinging arm, said extending member having a detent at the outer end thereof, a pin projection integral to said objective carrier and coacting with the movement thereof in operable contact with said detent portion of said extending member, said extending member following the reciprocal movement of said objective carrier as set forth.

3. In a photographic apparatus including its objective carrier, a range finder mounted on said apparatus, said range finder including in a container two mirrors, one movable relative to the other, a swinging bar pivotally operable in said range finder, said movable or tilting mirror attached to said swinging bar at the lower end thereof, a pin attached to the upper end of said bar, said pin in slidably operable contact with a tapered surface plate, an adjustable bar integral to said plate, said bar pivoted to a swinging segment, said segment in operable contact with a rocking bar, said rocking bar causing the reciprocal movement of said pin along said tapered surface plate thereby causing said tilting mirror to move variably in accordance with the angle of the plane of said surface plate, said rocking bar in operable contact with linkage means, said linkage means contiguous to and moved by said objective carrier whereby the tilting movement of said mirror is made through the medium of the adjustable movement of the objective carrier aforesaid.

4. The structure as set forth in claim 3, said rocking bar balanced upon a pivot point, said pivot point adjustably movable, said adjustment in accordance with the focal length of the lens that is attached to the objective carrier aforesaid.

5. The structure as set forth in claim 3, said rocking bar balanced upon a pivot point, said pivot point integral to a movable plate, a scale pointer attached to said plate, a measured scale adjacent to said pointer whereby the adjusted position of said pivot point may be indicated upon the scale aforesaid.

6. The structure as set forth in claim 3, said rocking bar balanced upon a pivot point, said pivot point integral to a movable plate, said plate formed on an inclined plane at one end thereof, said inclined plane changing the angular relation of said rocking bar with respect to the linkage means aforesaid.

7. The structure as set forth in claim 3, said adjustable bar having a slot, a screw and washer set in said slot, said screw screwed into said tapered surface plate adjustably securing said plate with the adjustable bar aforesaid.

8. The structure as set forth in claim 3, and a slidable plate attached to the wall of said range finder, a setting screw screwed through said plate and said wall, said screw in contact with said adjustable bar, the movement of said plate for varying adjustments of said adjustable bar enabling the correct setting of the range finder aforesaid.

9. The structure as set forth in claim 3, a slidable plate attached to the wall of said range finder, a setting screw and pointer thereon, said setting screw screwed through said plate and said wall, said screw in contact with said adjustable bar, the movement of said plate enabling varying adjustments of said adjustable bar, a scale attached to the outer wall of said range finder and contiguous to said pointer thereby enabling the setting of adjustment of the range finder aforesaid.

MORRIS SCHWARTZ.
WILLIAM CASTEDELLO.